US005230525A

United States Patent [19]

Delmerico et al.

[11] Patent Number: 5,230,525

[45] Date of Patent: Jul. 27, 1993

[54] STEP-ON WASTE CONTAINER

[75] Inventors: Paul E. Delmerico, Winchester; Charles T. Ingles, Bentonville, both of Va.

[73] Assignee: Rubbermaid Commercial Products Inc., Winchester, Va.

[21] Appl. No.: 720,643

[22] Filed: Jun. 25, 1991

[51] Int. Cl.[5] ................................................ B62B 1/10

[52] U.S. Cl. ............................ 280/47.131; 280/47.76; 280/79.2; 280/79.5; 230/264; 230/337

[58] Field of Search ................ 280/47.26, 47.34, 79.2, 280/651, 63, 659, 79.5, 76.7, 47.131; 220/264, 263, 262, 1 T, 335, 337, 403, 404, 94 A, 908; 4/251; 49/357

[56] References Cited

U.S. PATENT DOCUMENTS

| | | | |
|---|---|---|---|
| D. 241,499 | 9/1976 | Raftery | D7/195 |
| D. 261,720 | 11/1981 | Brazis | D34/9 |
| D. 288,019 | 1/1987 | Gebhard et al. | D32/36 |
| 1,236,429 | 8/1917 | Hansen . | |
| 2,001,445 | 5/1935 | Abele | 220/36 |
| 2,071,486 | 2/1937 | Wright | 220/36 |
| 2,096,506 | 10/1937 | Brandstrom | 248/147 |
| 2,216,279 | 10/1940 | Packer | 220/36 |
| 2,456,840 | 12/1948 | Rogers et al. | 220/36 |
| 2,475,125 | 7/1949 | Brownell | 220/36 |
| 2,532,165 | 11/1950 | Hermani | 220/36 |
| 2,563,456 | 8/1951 | Brownell | 220/36 |
| 2,615,663 | 10/1952 | Hamilton | 248/147 |
| 2,811,329 | 10/1957 | Press et al. | 248/147 |
| 2,818,271 | 12/1957 | Saeli | 280/79.2 |
| 2,910,206 | 10/1959 | Hodgson | 220/17 |
| 2,946,474 | 7/1960 | Knapp | 220/17 |
| 3,008,604 | 11/1961 | Garner | 220/178 |
| 3,088,425 | 5/1963 | La Rue | 110/178 |
| 3,450,297 | 6/1969 | Clerk | 220/36 |
| 4,081,105 | 3/1978 | Dagonnet et al. | 220/263 |
| 4,119,240 | 10/1978 | Dumas et al. | 220/331 |
| 4,150,764 | 4/1979 | Anderson | 220/263 |
| 4,200,197 | 4/1980 | Meyer et al. | 220/263 |
| 4,303,174 | 12/1981 | Anderson | 220/263 |
| 4,445,619 | 5/1984 | Kubic et al. | 220/263 |
| 4,765,548 | 8/1988 | Sing | 241/101.3 |
| 4,785,964 | 11/1988 | Miller et al. | 220/263 |
| 4,865,214 | 9/1989 | Kola et al. | 220/263 |
| 4,972,966 | 11/1990 | Craft, Jr. | 220/264 |
| 5,074,572 | 12/1991 | Delmerico et al. | 280/79.5 |

*Primary Examiner*—Richard M. Camby

*Attorney, Agent, or Firm*—Renner, Kenner, Greive, Bobak, Taylor & Weber

[57] ABSTRACT

A waste container (10) includes a base portion (11) having an open top to receive waste material therethrough and a cover (12) to close the open top. A pivotable pedal (22) is carried by the base portion (11) and has the lower end of a lifter bar (26) attached thereto. The top of the lifter bar (26) is bifurcated to form flexible tines (34) with a bearing member (35) therebetween. Pin members (36) extend outwardly from the tines (34) and are received in apertures (37) in a bracket (32) carried by the cover (12). The bracket (32) is also provided with ribs (38) to engage the bearing member (35) of the lifter bar (26). Fins (40) carried by the cover (12) also engage lugs (42) carried by the base portion (11). Sockets (44) formed on the cover (12) are aligned with knuckles (47) formed on the base portion (11) and together they receive hinge pins (50) therethrough so that upon pivoting of the pedal (22), the bearing member (35) of the lifter bar (26) engages the ribs (38) of the cover (12) to cause the cover (12) to rotate on the hinge pins (50) to thereby expose the open top of the base portion (11). The sockets (44) have a countersunk recess (45) to receive an enlarged head (51) of the hinge pins (50). A compressible lock barb (54) on the opposite end of hinge pins (50) holds hinge pins (50) in place.

29 Claims, 4 Drawing Sheets

STEP-ON WASTE CONTAINER

TECHNICAL FIELD

This invention relates to a waste receptacle. More particularly, this invention relates to a waste receptacle of the type which is opened by the actuation of a foot pedal. Specifically, this invention relates to the manner in which the cover is connected to the base portion of the container and to the operating mechanism which permits the cover to be opened by the foot pedal.

BACKGROUND ART

Waste containers of the type which have a cover hinged to a base container portion the operation of a foot pedal to rotate the cover on the hinge are well known in the art. Typical of such containers are those shown in U.S. Pat. Nos. 4,972,966; 4,865,214 and 4,785,964. These particular containers are all of the type which require two separate foot operations, that is, one depression of the pedal is required to open the container followed by a second depression of the pedal to close the container. While such a system is practical and often desirable for home use, in the commercial environment, such as restaurants, hospitals and the like, to which the present invention is specially directed, the possibility of leaving a container open cannot be tolerated. Thus, in the commercial environment the system must operate such that the cover remains open only as long as there is foot pressure on the pedal.

While such step-on containers, requiring only one foot operation to open and close the containers, are also known in the art, most of these types of products, as well as those which require two separate foot operations, are difficult to assemble and/or include several metallic parts for what otherwise is an all-plastic product. Such metallic parts not only add significant cost to the product but also contribute to the difficulty in assembly. Specifically, the prior art products do not provide for all-plastic containers in which both the attachment of the cover to the base and the cover to the pedal operating mechanism are easy to accomplish without the necessity of any mechanical fasteners.

DISCLOSURE OF THE INVENTION

It is thus an object of the present invention to provide a step-on waste container which is easy to assemble and which has a cover and base portion made entirely out of plastic.

It is another object of the present invention to provide a step-on waste container, as above, in which the cover is readily attachable to the foot pedal operating mechanism.

It is a further object of the present invention to provide a step-on waste container, as above, in which the cover is readily attachable to the base, refuse receiving, portion of the waste container.

It is an additional object of the present invention to provide a step-on waste container, as above, in which no mechanical fasteners are required.

It is a still further object of the present invention to provide a step-on waste container, as above, which is configured such that potential odors from the contents of the container are confined within the container.

It is yet another object of the present invention to provide a step-on waste container, as above, which is provided with a means to receive and hold a conventional deodorant block.

It is still another object of the present invention to provide a step-on waste container which can optionally be provided with wheels to render the container readily mobile.

These and other objects of the present invention, as well as the advantages thereof over existing prior art forms, which will become apparent from the description to follow, are accomplished by the means hereinafter described and claimed.

In general, a waste container according to the present invention includes a base portion having an open top to receive waste material therethrough and a cover to close the open top. The bottom of a lifter bar is attached to a pivotable pedal carried by the base portion. Flexible tines formed at the top of the lifter bar are provided with pin members which are received in apertures provided in a bracket carried by the cover to thereby attach the upper end of the lifter bar to the cover. Sockets formed on the cover are aligned with knuckles formed on the base portion and together they receive hinge pins therethrough so that upon pivoting of the pedal, the lifter bar causes the cover to rotate on the hinge pins to thereby expose the open top of the base portion.

A preferred exemplary step-on waste container incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
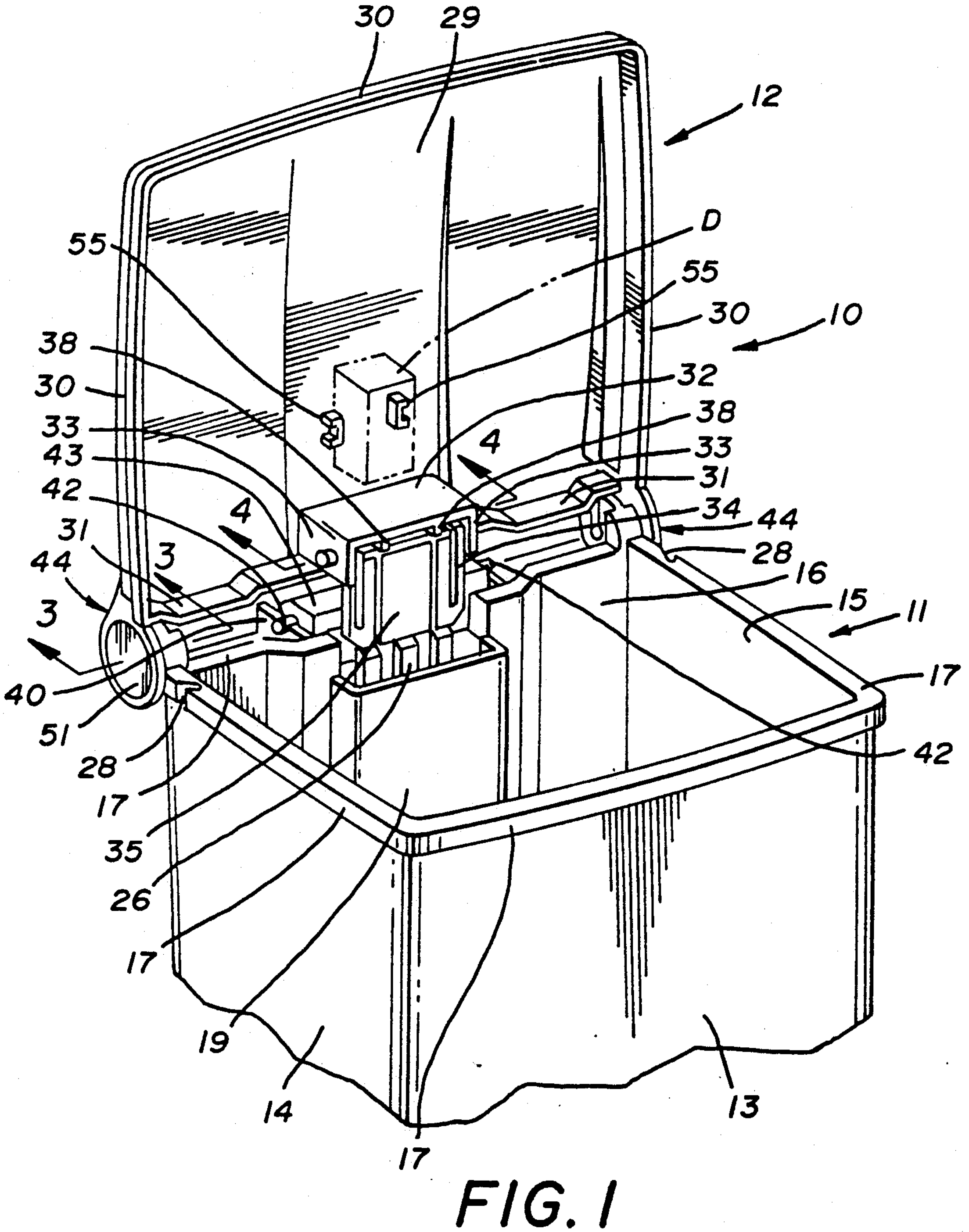
FIG. 1 is a fragmented, perspective view of the upper portion of a step-on waste container according to the concepts of the present invention showing the cover in an open position.

A waste container according to the concepts of the present invention is indicated generally by the numeral 10 and includes a base, waste receiving portion generally indicated by the numeral 11 and a cover generally indicated by the numeral 12. All components of base portion 11 and cover 12, to be described herein, are made of a plastic material, preferably one suitable for injection molding such as polyethylene, polypropylene or the like.

Base portion 11 includes a generally vertical front wall 13, generally vertical side walls 14 and 15, and a generally vertical rear wall 16. Walls 13, 14, 15 and 16 are provided with an upper rim 17 which defines an open top through which refuse may be received by base portion 11. Walls, 13, 14, 15 and 16 can be of any general configuration, that is, they could be adorned with panels, recesses or the like without departing from the concepts of the present invention. Thus, side walls 14 and 15 are shown as being rather plain as are front wall 13 and rear wall 16, for the most part. However, as shown in FIGS. 5 and 6, front wall 13 is provided with a pedal receiving recess 18 at the lower end thereof and rear wall 16 is dished in, as at 19, to provide a channel for the operating mechanism to be hereinafter described.

Figure 5:
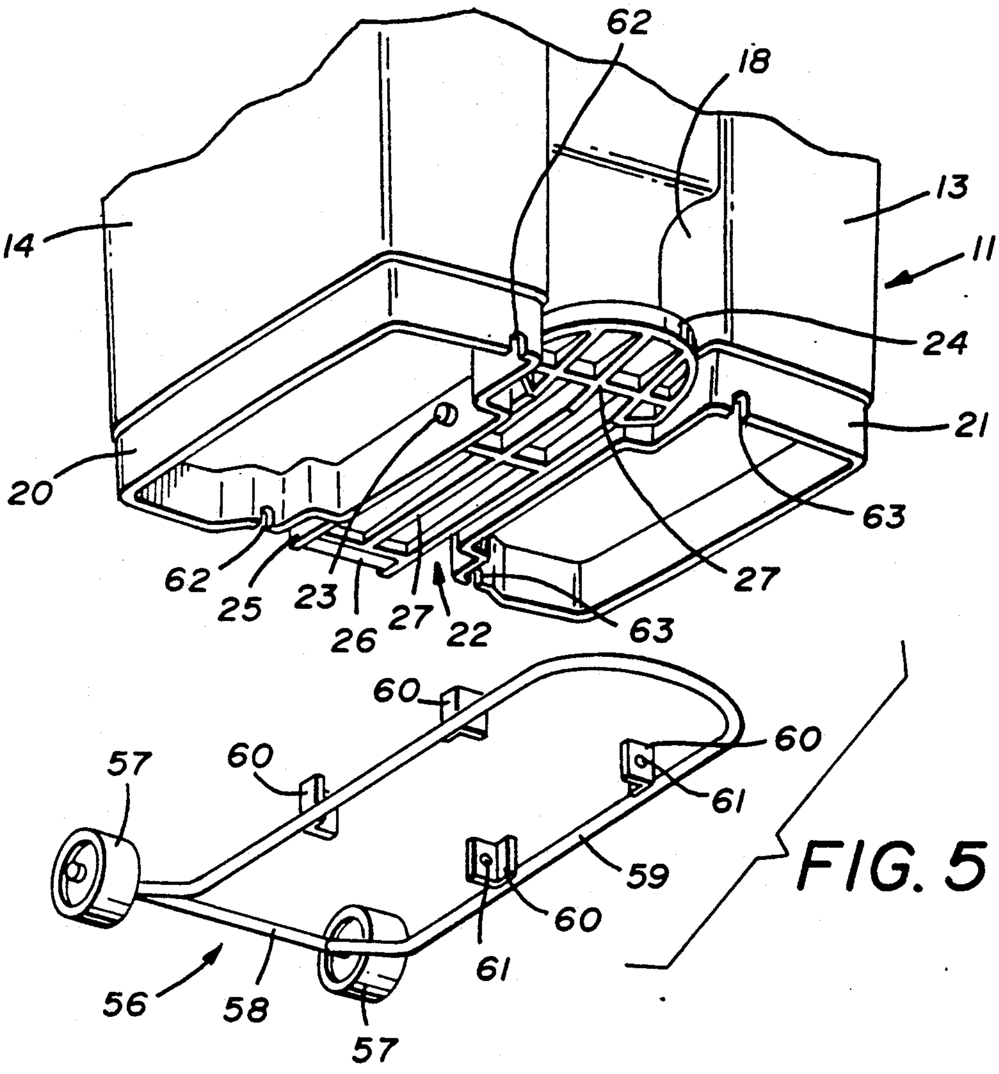
FIG. 5 is an exploded, fragmented, perspective view of the lower portion of the step-on waste container according to the concepts of the present invention showing a wheel adaptor assembly prior to attachment to the base portion of the container.
Figure 6:
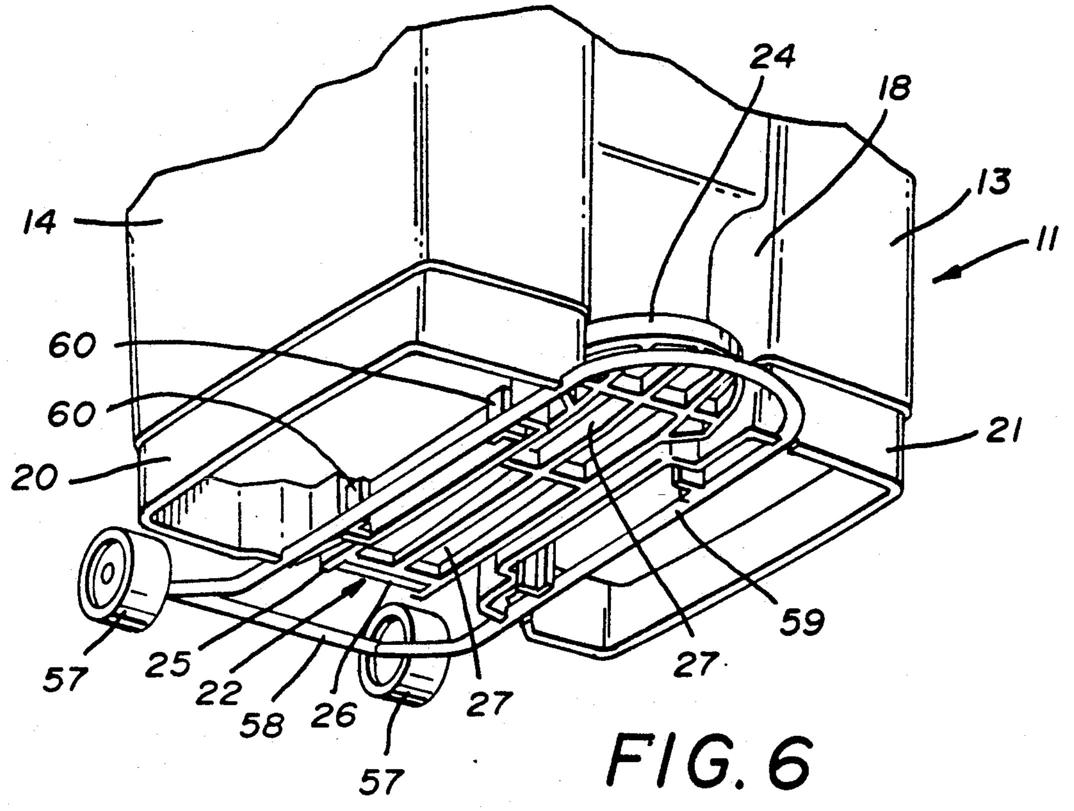
FIG. 6 is a view similar to FIG. 5 but showing the wheel adaptor connected to the base portion of the container.

The bottom of base portion 11 is shown in FIGS. 5 and 6 and includes spaced, hollowed out pedestals 20 and 21. A conventional foot pedal, generally indicated by the numeral 22, is received in the space between pedestals 20 and 21 and is pivotally mounted thereto as by pins 23 (one shown). The front end of pedal 22 is received within the lower portion of recess 18 of front wall 13 and is formed as a foot receiving surface 24. The rear end of pedal 22 is attached, as at 25, to the bottom of an operating mechanism in the form of a lifter upright bar 26 which extends upwardly within dished in portion 19 of rear wall 16. The bottom of pedal 22 can be provided with reinforcing webbing 27, as desired. As is conventional with step-on waste containers, downward pressure on foot receiving surface 24 of pedal 22 pivots pedal 22 on pins 23 thereby raising lifter bar 26 to pivot cover 12 in a manner to be hereinafter described.

If desired, base portion 11 may be provided with a separate removable internal liner (not shown) of a profile which would generally mimic the inner profile of base container portion 11 and which would receive the waste material thereby keeping base container portion 11 clean from the residue of any materials placed therein. In addition, if the user of waste container 10 would desire to utilize a conventional plastic trash bag to collect the waste material, in addition to or in place of the liner just described, upper rim 17 is notched, as at 28, at the top of side walls 14 and 15 so that a plastic bag may be hooked thereto, with its mouth thereafter being stretched around the periphery of rim 17.

Cover 12 is shown as being generally rectangular in configuration having a paneled, but nevertheless relatively plain, top surface 29 with a downwardly directed skirt 30 depending from the front and two sides thereof. Skirt 30 is adapted to fit around the outer periphery of upper rim 17 of base portion 11 when cover 12 is closed thereon. As such, a barrier to the release of offensive odors is formed at the front and sides of container 10. Rear skirts 31 extend downwardly from top surface 29 and, with a centrally located operating mechanism mounting bracket 32, spans between side skirts 30. Skirts 31 are generally configured to mimic back wall 16 of base portion 11 and bracket 32 generally mimics dished in area 19 of back wall 16 such that when cover 12 is closed on base portion 11, skirts 31 and bracket 32 extend downwardly within the open top of base portion 11 thereby sealing the rear of container 10 from air flow and the concomitant release of offensive odors.

Figure 2:
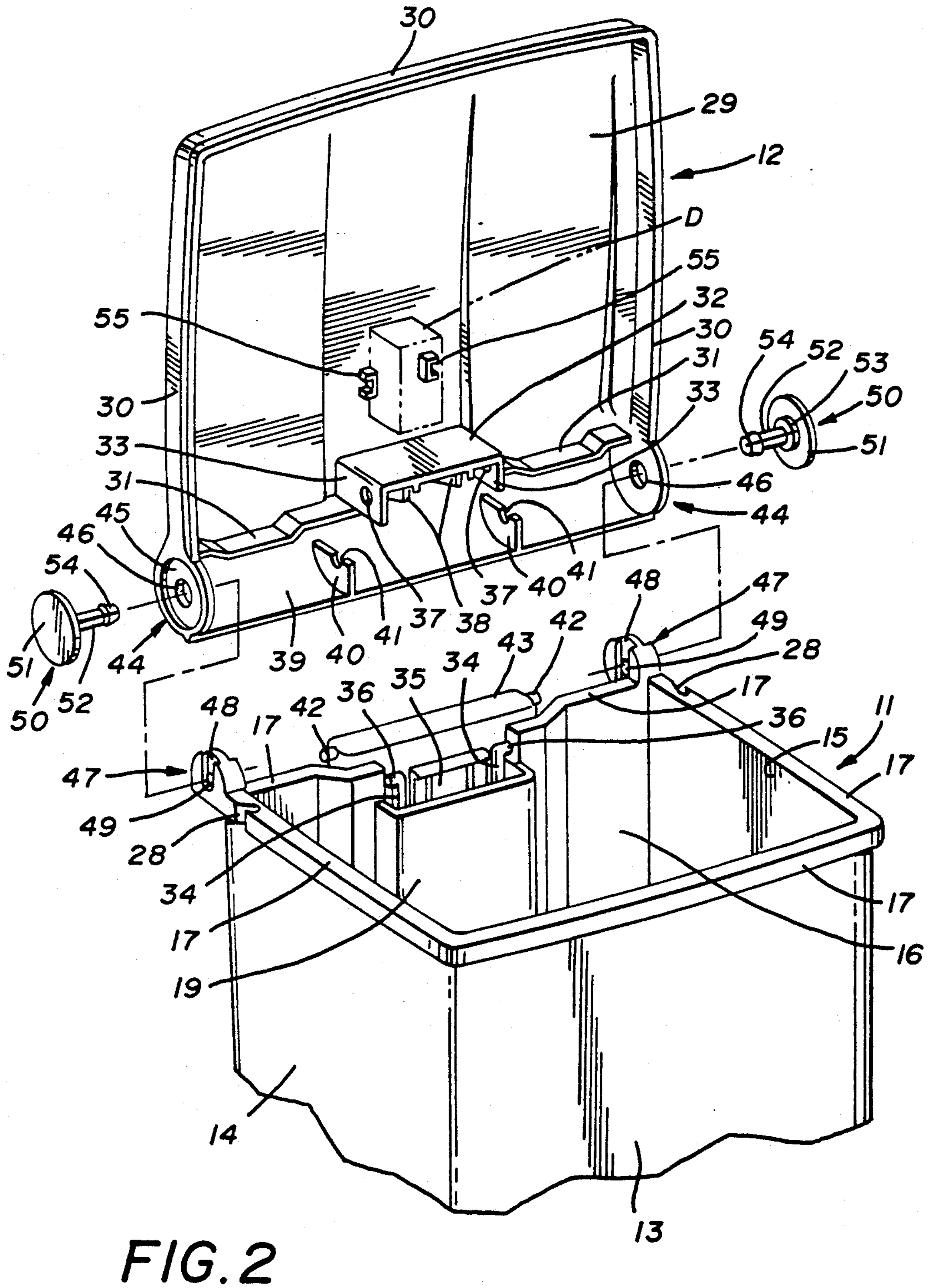
FIG. 2 is an exploded view similar to FIG. 1 but showing the cover and base components separated prior to assembly.
Figure 4:
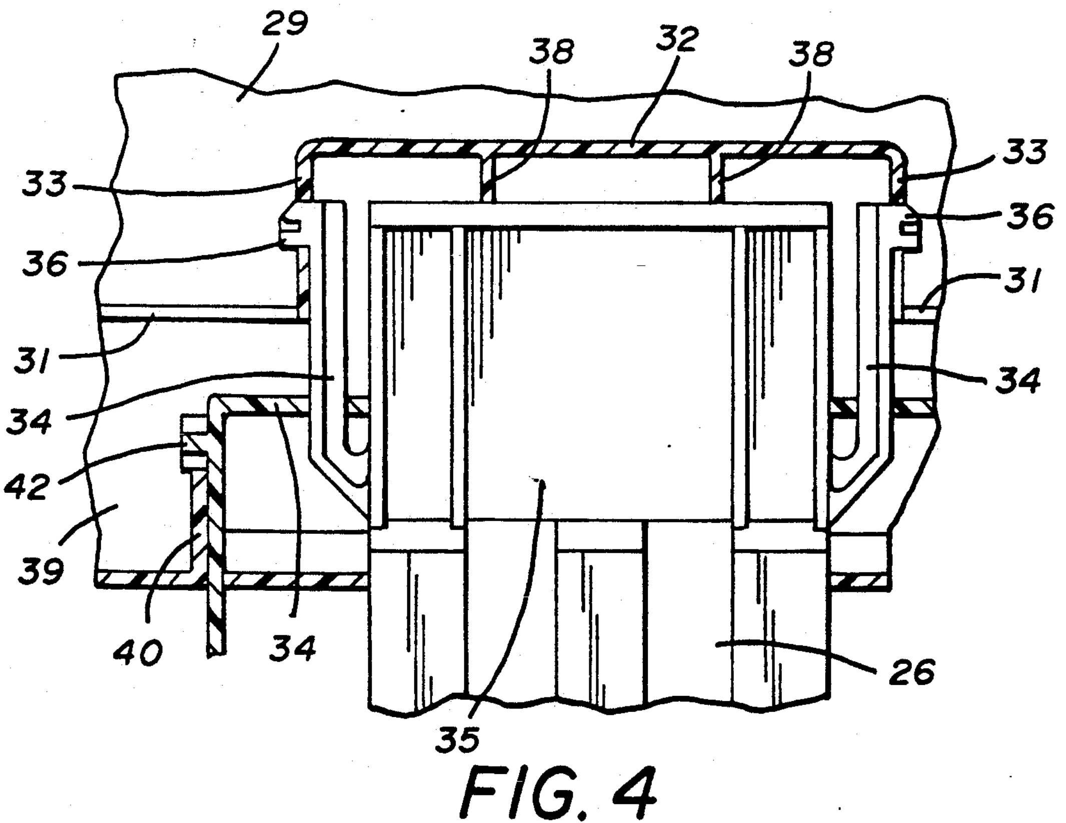
FIG. 4 is a fragmented sectional view taken substantially along line 4—4 of FIG. 1.

Bracket 32 is thus generally U-shaped having side branches 33 which are adapted to engage the top of lifter bar 26 in a manner now to be described. As shown in FIGS. 1, 2 and 4, the top of lifter bar 26 is bifurcated having flexible outer tines 34 separated from an inner bearing member 35. The top of each tine 34 is provided with a split pin member 36 extending generally laterally therefrom. Branches 33 of bracket 32 are provided with apertures 37 which are alignable with pin members 36. Lifter bar 26 is easily attached to bracket 32 by merely squeezing tines 34 inwardly and then releasing them so that pin members 36 snap into apertures 37.

Bracket 32 is also provided with two bearing ribs 38 which, as best seen in FIG. 4, are engaged by the top of inner bearing member 35 of lifter bar 26. Thus, when pedal 22 is depressed, lifter bar 26 moves vertically upwardly with the top of member 35 pushing against bearing ribs 38 providing the force to rotate cover 12 to its open position. Of course, at this time, pins 36 are rotating within apertures 37. Release of the pressure on pedal 22 drops bar 26 and closes cover 12.

Instead of being provided with a downwardly directed skirt, such as skirt 30, the back of cover 12 is provided with an arcuate surface 39 which curves over an arc of approximately ninety degrees. Surface 39 is provided with two support fins 40 depending therefrom which are notched, as at 41. Notches 41 are adapted to engage lugs 42 extending outwardly from a rear support bar 43 positioned on the top of upper rim 17 at the rear of base portion 11 and spanning the channel for lifter bar 26. As lifter bar 26 is pushing against bearing ribs 28, as just described, the counter action of fins 40 on lugs 42 prevents cover 12 from bowing at the center and otherwise evenly distributes the opening force on the cover. Of course, as cover 12 rotates, fins 40 rotate around lugs 42. Support bar 43 can be hollowed out underneath to serve as a handle for container 10 should it be desired to manually transport the same.

As best shown in FIG. 2, cover 12 is provided with two circular sockets, indicated generally by the numeral 44, positioned at the rear end of side skirts 30 and within arcuate skirt 39. Each socket 44 includes a countersunk circular recess 45 and an aperture 46. Base portion 11 is similarly provided with two knuckles, indicated generally by the numeral 47, extending rearwardly and upwardly from the rear corners thereof. Knuckles 47 are generally semicircular in nature and can be provided, for ease of molding, with generally vertical slots 48 therein. A bore 49 extends through each knuckle 47 and is preferably smaller in diameter than apertures 46 of sockets 44.

Sockets 44 and knuckles 47 are adapted to receive hinge pins indicated generally by the numeral 50. Hinge pins 50 include a large circular head 51 of a size generally equivalent to recesses 45 in sockets 44. A slotted axle pin 52 extends inwardly from head 51, with a collar 53 being formed on pin 52 on the inner side of head 51. Collar 53 is preferably of a diameter generally equivalent to the diameter of socket aperture 46, and pin 52 is of a diameter generally equivalent to that of bore 49 of knuckle 47. Pin 52 terminates inwardly as a slotted tapered lock barb 54 of a larger diameter than the main body of pin 52 and bore 49.

Figure 3:
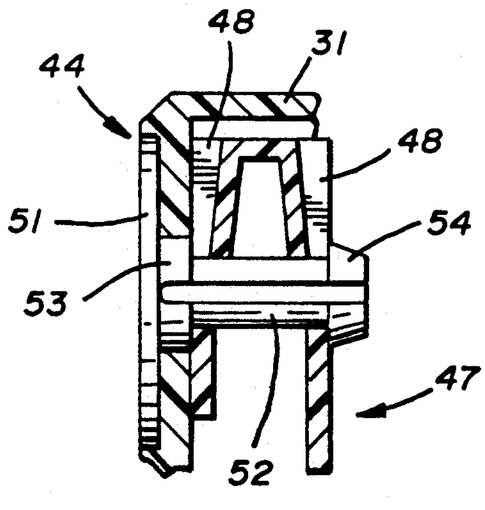
FIG. 3 is a fragmented sectional view taken substantially along line 3—3 of FIG. 1.

The manner in which cover 12 is readily attached to base portion 11 should now be evident. First lifter bar 26 is attached to bracket 32 by compressing tines 34 to locate pins 36 in bracket apertures 37, as previously described. At this same time lugs 42 are located in notches 41 of fins 40 and apertures 46 of sockets 44 are aligned with bores 49 of knuckles 47. Then merely inserting hinge pins 50 through apertures 46 and bores 49 locks cover 12 in place. As shown in FIG. 3, in this position, head 51 of hinge pin 50 is received flush within socket recess 45, hinge pin collar 53 is within socket aperture 46, and lock barb 54, which has been compressed as it passes through knuckle bore 49, has snapped into place to bear against knuckle 47. Axle pin 52 thus provides the axis upon which cover 12 rotates upon actuation of foot pedal 22.

Waste container 10 may also be provided with a number of accessory features. For example, as shown in FIGS. 1 and 2, the underside of cover top surface 29 may be provided with opposed clips 55 which are adapted to receive and hold a conventional deodorizer block D shown in phantom.

Moreover, container 10 is readily adapted to being rendered mobile, that is, mounted on wheels, if desired. Shown in FIGS. 5 and 6 is a wheel adaptor, generally indicated by the numeral 56, which includes wheels 57 rotatably mounted on an axle 58. A hoop bracket 59 is attached to axle 58 and carries a plurality of mounting brackets 60, having apertures 61 therethrough. Base pedestals 20 and 21 of container 10 can be provided with aligned slots 62 and 63, respectively, to receive hoop bracket 59, as shown in FIG. 6. Fasteners (not shown) may then be utilized to attach brackets 60 to the inner walls of pedestals 20 and 21. Thus, wheels 57 extend rearwardly from container 10 and merely tipping container 10 onto wheels 57 permits the facile transporting of container 10, as desired.

It should thus be evident that a waste container constructed according to the concepts of the present invention, as described herein, accomplishes the objects of the present invention and otherwise substantially improves the art.

We claim:

1. A waste container comprising a base portion having an open top to receive waste material therethrough, a cover to close the open top of said base portion, a lifter bar attached at its lower end to said pedal, means to attach the upper end of said lifter bar to said cover, separate hinge pin means removable from said cover and said base portion and connecting said cover to said base portion when inserted into said cover and said base portion so that upon pivoting of said pedal said lifter bar causes said cover to rotate on said hinge pin means and pivot with respect to said base portion to thereby expose the open top of said base portion, socket means, on said cover to receive said hinge pin means, and knuckle means on said base portion having an aperture alignable with said socket means to receive a portion of said hinge pin means therethrough.

2. A waste container according to claim 1 wherein said upper end of said lifter bar is bifurcated to form flexible tines, and wherein said means to attach includes pin members extending outwardly from said tines and a bracket extending downwardly from said cover, said bracket having apertures therein to receive said pin members upon flexing of said tines.

3. A waste container according to claim 1 wherein said upper end of said lifter bar is provided with a bearing member, and further comprising rib means extending downwardly from said cover to engage said bearing member.

4. A waste container according to claim 3 wherein said upper end of said lifter bar is bifurcated to form flexible tines, said bearing member being spaced from and between said tines, and wherein said means to attach includes pin members extending outwardly from said tines and a bracket extending downwardly from said cover, said bracket carrying said rib means and having apertures therein to receive said pin members upon flexing of said tines.

5. A waste container according to claim 1 further comprising lug members carried by said base portion and fin means extending downwardly from said cover to engage said lug members.

6. A waste container comprising a base portion having an open top to receive waste material therethrough, a cover to close the open top of said base portion, a pivotable pedal carried by said base portion, a lifter bar attached at its lower end to said pedal, means to attach the upper end of said lifter bar to said cover, hinge pins means to connect said cover to said base portion so that upon pivoting of said pedal said lifter bar causes said cover to rotate on said hinge pin means and pivot with respect to said base portion to thereby expose the open top of said base portion, socket means on said cover to receive said hinge pin means, knuckle means on said base portion alignable with said socket means to receive said hinge pin means, lug members carried by said base portion and fin means extending downwardly from said cover and having notches to receives said lug members, said fin means rotating with respect to said lug members when said cover is rotating on said hinge pin means.

7. A waste container comprising a base portion having an open top to receive waste material therethrough, a cover to close the open top of said base portion, a pivotable pedal carried by said base portion, a lifter bar attached at its lower end to said pedal, means to attach the upper end of said lifter bar to said cover, hinge pins means to connect said cover to said base portion so that upon pivoting of said pedal said lifter bar causes said cover to rotate on said hinge pin means and pivot with respect to said base portion to thereby expose the open top of said base portion, said hinge pin means including a head member carrying a hinge axle, socket means on said cover to receive said hinge pin means, said socket means having a countersunk recess to receive said head member and an aperture to receive said hinge axle, and knuckle means on said base portion alignable with said socket means to receive said hinge pin means.

8. A waste container according to claim 7 wherein said hinge pin means further includes an enlarged collar around said hinge axle and adjacent to said head member, said collar being of a size substantially equivalent to said aperture of said socket means and being received therein.

9. A waste container according to claim 7 wherein said knuckle means includes a bore therethrough alignable with said aperture of said socket means and receiving said hinge axle.

10. A waste container according to claim 9 wherein said hinge pin means further includes a compressible barb member carried by said hinge axle at the end opposite said head member, said barb member being of a size larger than said bore of said knuckle means and being compressed to pass therethrough to lock said hinge pin means in place.

11. A waste container according to claim 1 wherein said cover includes a top surface and skirts extending downwardly from said top surface to surround the open top of said base portion.

12. A waste container according to claim 1 further comprising a rim formed on the open top of said base portion, and notch means on said rim to receive and hold a plastic liner.

13. A waste container according to claim 1 further comprising means carried at the bottom of said base portion to render the waste container mobile.

14. A waste container according to claim 13 wherein said means to render the waste container mobile includes an axle, wheels carried on said axle, a bracket attached to said axle, and means to attach said bracket to the bottom of said base portion.

15. A waste container according to claim 14 wherein the bottom of said base portion is slotted to receive said bracket.

16. A waste container comprising a base portion having an open top to receive waste material therethrough, a cover to close the open top of said base portion, hinge means to connect said cover to said base portion so that said cover can rotate with respect to said base portion, a pivotable pedal carried by said base portion, a lifter bar attached at its lower end to said pedal, flexible tines formed at the upper end of said lifter bar, pin members extending outwardly from said tines, and a bracket carried by said cover, said bracket having apertures therein to receive said pin members upon flexing of said tines.

17. A waste container according to claim 16 wherein said upper end of said lifter bar is provided with a bearing member, and further comprising rib means extending downwardly from said cover to engage said bearing member.

18. A waste container according to claim 16 further comprising lug members carried by said base portion and fin means extending downwardly from said cover to engage said lug members.

19. A waste container according to claim 18 wherein said fin means includes notches to receive said lug members, said fin means rotating with respect to said lug members when said cover is rotating on said hinge means.

20. A waste container according to claim 16 wherein said hinge means includes hinge pin means about which said cover can rotate, socket means on said cover to receive said hinge pin means, and knuckle means on said base portion alignable with said socket means to receive said hinge pin means.

21. A waste container according to claim 20 wherein said hinge pin means includes a head member carrying a hinge axle, said socket means having a countersunk recess to receive said head member and an aperture to receive said hinge axle.

22. A waste container according to claim 21 wherein said hinge pin means further includes an enlarged collar around said hinge axle and adjacent to said head member, said collar being of a size substantially equivalent to said aperture of said socket means and being received therein.

23. A waste container according to claim 21 wherein said knuckle means includes a bore therethrough alignable with said aperture of said socket means and receiving said hinge axle.

24. A waste container according to claim 23 wherein said hinge pin means further includes a compressible barb member carried by said hinge axle at the end opposite said head member, said barb member being of a size larger than said bore of said knuckle means and being compressed to pass therethrough to lock said hinge pin means in place.

25. A waste container according to claim 16 wherein said cover includes a top surface and skirts extending downwardly from said top surface to surround the open top of said base portion.

26. A waste container according to claim 16 further comprising a rim formed on the open top of said base portion, and notch means on said rim to receive a plastic liner.

27. A waste container according to claim 16 further comprising means carried at the bottom of said base portion to render the waste container mobile.

28. A waste container according to claim 27 wherein said means to render the waste container mobile includes an axle, wheels carried on said axle, a bracket attached to said axle, and means to attach said bracket to the bottom of said base portion.

29. A waste container according to claim 28 wherein the bottom of said base portion is slotted to receive said bracket.

* * * * *

UNITED STATES PATENT AND TRADEMARK OFFICE
CERTIFICATE OF CORRECTION

PATENT NO. : 5,230,525

DATED : July 27, 1993

INVENTOR(S) : Paul E. Delmerico and Charles T. Ingles

It is certified that error appears in the above-identified patent and that said Letters Patent is hereby corrected as shown below:

Column 1, line 16, following the word "portion" insert --and which are opened by--.

Column 5, line 34 (claim 1), following the words "base portion," insert --a pivotable pedal carried by said base portion,--.

Column 5, line 43 (claim 1), following the word "means" delete the ",".

Column 6, line 20 (claim 6), "receives" should read --receive--.

Signed and Sealed this

Fourteenth Day of June, 1994

Attest:

BRUCE LEHMAN

*Attesting Officer*

*Commissioner of Patents and Trademarks*